F. E. SUMMERS.
ORNITHOPTER.
APPLICATION FILED JAN. 4, 1916.
1,235,856.
Patented Aug. 7, 1917.
3 SHEETS—SHEET 3.
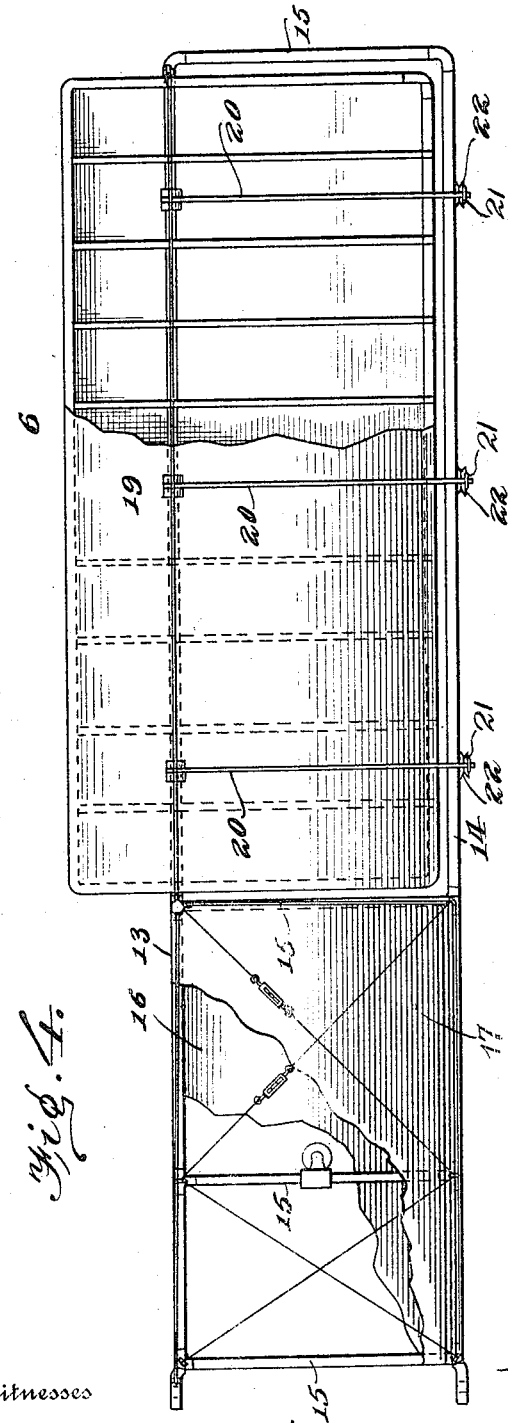
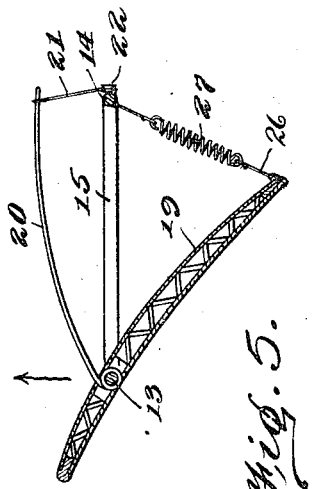
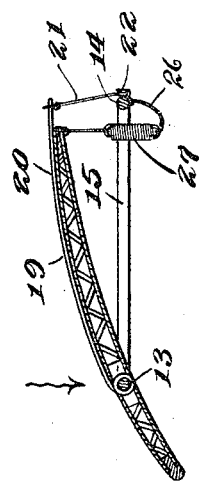
Inventor
Frank E. Summers,
By Victor J. Evans
Attorney
Witnesses
H. N. Lybrand
C. C. Hines.

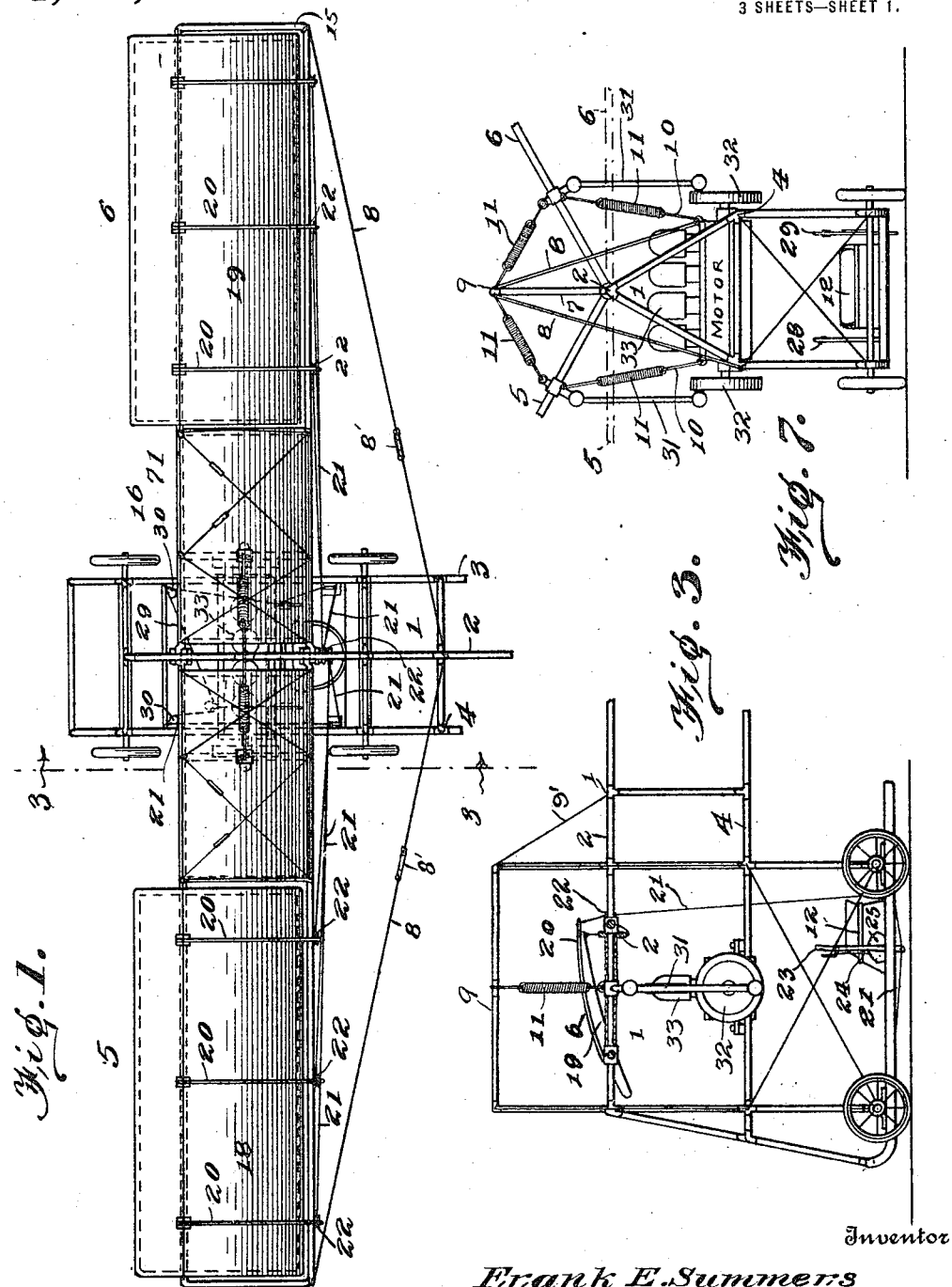

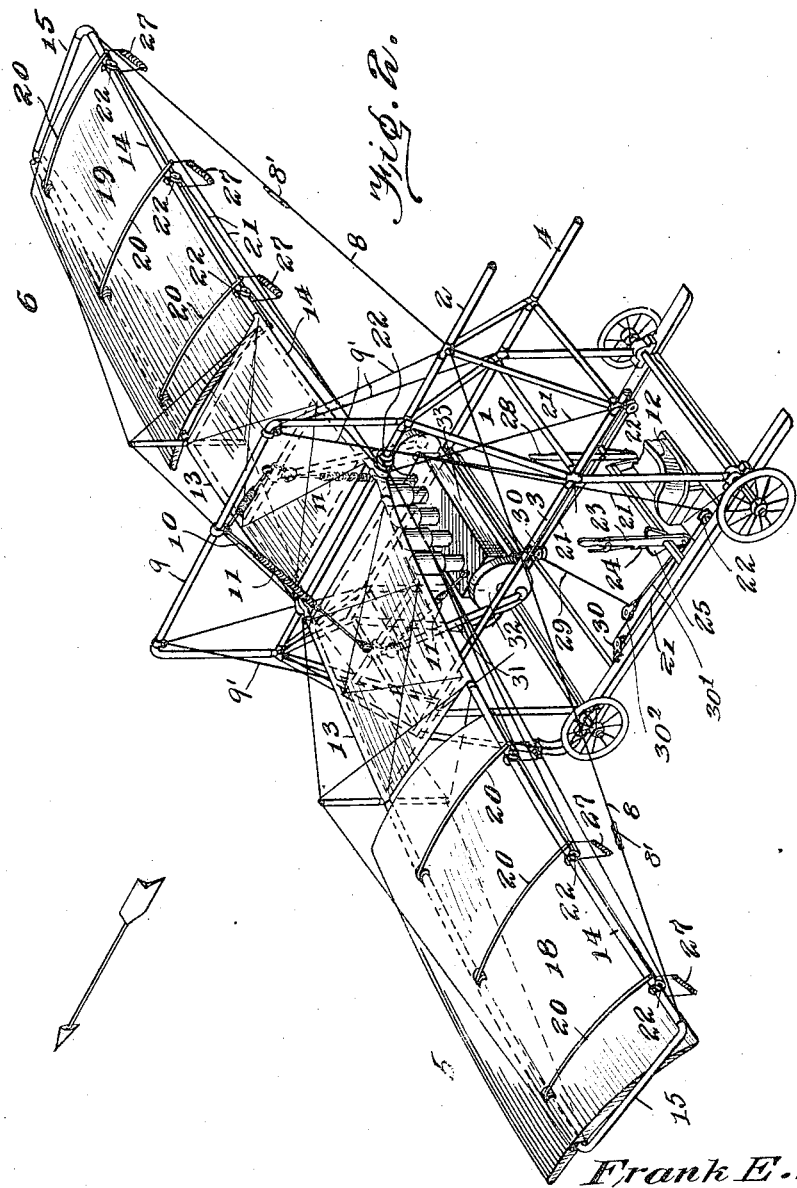

UNITED STATES PATENT OFFICE.

FRANK EZRA SUMMERS, OF MEMPHIS, MISSOURI.

ORNITHOPTER.

1,235,856. Specification of Letters Patent. Patented Aug. 7, 1917.

Application filed January 4, 1916. Serial No. 70,139.

*To all whom it may concern:*

Be it known that I, FRANK E. SUMMERS, a citizen of the United States, residing at Memphis, in the county of Scotland and State of Missouri, have invented new and useful Improvements in Ornithopters, of which the following is a specification.

My invention relates to flying machines, and particularly to sustaining and propelling means of the ornithopter type for such machines.

One object of my invention is to provide a sustaining and propelling surface comprising flapping wings having pivoted sections adapted to partially or wholly close on the down stroke and to feather or open fully on the up stroke, whereby a lifting and sustaining thrust is obtained on the down stroke and the wings permitted to move upward on the return stroke without material resistance while maintaining the continuity of flight of the machine.

A further object of the invention is to provide flapping wings having pivoted wing sections which are adjustable, so that the ratio of lift to thrust can be changed during flight or travel.

A further object of the invention is to provide flapping wings in which the lift and thrust are normally balanced, but in which the lift and thrust can be unbalanced during travel to stabilize the machine or to bank the machine for a turning action.

A still further object of the invention is to provide flapping wings with pivoted feathering sections which are adjustable to vary the curvature or pitch of the wing so as to vary its sustaining and propulsive action.

A still further object of the invention is to provide flapping wings with pivoted wing sections which are adjusted to working positions and feathered by air pressure, which are controllable to vary their working pitch or inclination, and which are yieldingly controlled in their feathering actions.

A still further object of the invention is to provide means for limiting the movements of the wing sections to working position, and to vary their working pitch or angle, and for adjusting the wing sections to change their working angles relative to one another, and to provide means for resiliently balancing the wings.

A still further object of the invention is to provide a supporting surface whereby the machine may be caused to hover or travel at any given speed.

With these and other objects in view, the invention consists of the features of construction, combination and arrangement of parts herein fully described and claimed, reference being had to the accompanying drawings in which:—

Figure 1 is a top plan view of a supporting and propelling surface of the ornithopter type embodying my invention.

Fig. 2 is a rear perspective view of the same.

Fig. 3 is a vertical longitudinal section on line 3—3 of Fig. 1.

Fig. 4 is a top plan view, with portions broken away, of one of the wings on an enlarged scale.

Fig. 5 is a vertical fore-and-aft section through one of the wings, showing the feathering action of the pivoted wing section on the upward motion of the wing.

Fig. 6 is a similar view showing the pivoted wing section in working position as on the descent of the wing.

Fig. 7 is a front elevation of the main frame showing the mode of mounting the flapping wings.

Referring to the drawings, 1 designates the main frame of the machine, which may be of any suitable construction, and which includes parallel longitudinally extending frame bars 2, 3 and 4, which are suitably connected and reinforced and braced. Arranged on opposite sides of the frame and hinged or pivoted to the bar 2 so as to swing in a vertical plane, are beating or flapping wings 5 and 6, the frames of the rigid portions of said wings being stayed or reinforced from the frame 1 by truss wires 8 having suitable tensioning devices or turn buckles 8'. A truss bracket 9 is rigidly connected to the frame 1 and reinforced therefrom by stays 9'. Flexible connections 10 are also provided between the truss brackets and the wings and include coiled springs 11, whereby the weight of the wings is balanced, thus allowing said wings to be easily operated.

In practice, the wings may be vibrated or oscillated in a vertical plane by manual or motive power of any suitable character, it being understood that suitable operating devices to enable the aviator to operate the wings may be employed, as in my prior Patent No. 1,114,201 dated Oct. 20, 1914, or that any other suitable operating means for driving the wings from a gasolene or other motive power plant may be employed. In the present instance an aviator's or pilot's seat 12 is supported upon the frame 1, and other seats, or a car structure, may be employed so that, in addition to the aviator, one or more passengers may be carried.

Each wing 5 and 6 comprises a frame formed of front and rear wing spars 13 and 14, and suitable cross pieces 15, together with any preferred type of bracing, the framework of the imperforate portions of the wings being provided with any suitable covering 16 of fabric or metal. The inner portions 17 of the wings are preferably rigid and imperforate, while the outer portions of the wings are perforate and completed by hinged or pivoted wing sections 18 and 19. The wings are curved on a desired radius longitudinally, or transversely to the line of flight, and are also curved in a fore-and-aft direction, or between their lead and trail edges, the fore-and-aft curvature being preferably parabolical, so that the under surface of each wing will be concaved in both directions to confine the air against too rapid lateral escape, while at the same time providing for the aerodynamic compression of the air and the disposition of the wings at the proper angle of incidence for a sustaining action. The curvature of the wings is such that on each downward or beating motion of the wings both a lifting thrust and a propelling thrust are obtained, to sustain the machine in flight as well as propel it through the air.

The pivoted wing sections 18 and 19 are hinged or pivoted at a point between their leading edges and center of gravity to the front wing spar 13, so as to provide for a proper distribution of the load weight carried by the supporting surface, and coincidence of the centers of gravity and pressure. The wing sections 18 and 19 are preferably of the same structure as the body of the wing, each comprising a frame work and a suitable fabric or metallic covering to diminish skin friction and air resistance, the distance between the pivotal point of each wing and its trailing edge being less than the distance between the wing spars 13 and 14 so that the pivoted wing sections are adapted to swing vertically through the open portion of the wing frame, as clearly shown in Figs. 5 and 6.

On the downward or working stroke of each wing, the pivoted wing sections 18 and 19 swing upwardly at a desired working angle and compress the air beneath them for sustaining and propelling impulses, as shown in Fig. 6, while on the upward movement of the wings the pivoted wing sections 18 and 19 swing downward under the pressure of the air from above, so that they will feather or travel edgewise in a substantially vertical position, as shown in Fig. 5.

The upward swinging movements of the pivoted wing sections are limited by stop bars 20, which are spring connected to the front spar 13 of each wing, the spring connection tending to move the stop bars upward and away from the rear spars 14. The position of the stop bars may be controlled by means of a cable 21, the branched ends of which are connected to stop bars 20, and which may be operated to pull said bars toward spars 14 against the tension of the spring connections.

The cable 21 runs from the right hand wing stop bars, over guide pulleys 22, to the lever 28 to which it is connected, and from lever 28, over guide pulleys 30 and 22, to the left hand wing stop bars. It is clear that by operating lever 28, one end of cable 21 will have a pull exerted on it, thus pulling down the stop bars 20 and decreasing the extent of upward flapping of one wing, while the other end of the cable will be released, thus allowing the stop bars 20 of the other wing to spring upward, thereby increasing the extent of flapping of said other wing.

In order to simultaneously exert a pull or to release the stop bars 20 of both the wings, a lever 23 engaging a rack 25 by means of a locking dog 24 is provided. The lower end of lever 23, pivotally carries a link 30′, which, by means of a pulley $30^2$ on its end, engages a bight 29, formed in cable 21 between the pulleys 30. By operating lever 23, the effective length of cable 21 will be increased or decreased and the stop bars 20 of both wings correspondingly pulled down or permitted to spring up. At the same time, it will be noted that the lever, 23, owing to the pulley connection $30^2$, will in nowise interfere with the operation of the lever 28, so that great latitude in the simultaneous adjustment of the stop bars 20, either similarly or oppositely, is obtained.

Elastic connections 26, including coiled spring 27, couple the pivoted wing sections to the wing frames, and serve to limit the downward swinging or feathering movements of the pivoted wing sections, and provide for their initial movement through the reaction of the springs in the starting of the wing sections on their working motion.

In practice, of course, it is to be understood that the invention may be embodied in a manual driven or power driven machine or in an ordinary glider structure, the wings being operated in the case of a glider structure, to give an initial starting impulse. The invention is primarily designed, however, for use in a motor driven machine of the ornithopter type, whereby ornithopters or flapping wing machines may be operated with greater facility and efficiency and greater lifting, propelling and controlling power obtained, it being evident from the foregoing description that my invention provides a construction which is adapted to afford reliable and efficient service in these connections. In the present instance I have shown the wings connected by links or pitmen rods 31 with crank disks 32 on the shaft of a driving motor 33, whereby said wings are given a vibratory motion.

I claim:—

1. Supporting and propelling means for flying machines comprising a framework, vertically movable wings hinged or pivoted to the framework, each wing having a vertically movable section hinged at its forward edge thereto, means for vibrating the wings, spring mounted stop bars for limiting the upward movement of the hinged wing sections, means for simultaneously adjusting the bars associated with both movable wing sections to limit the upward movement of said movable wing sections, and means for simultaneously adjusting the bars to effect adjustment of the respective movable wing sections in opposite directions.

2. A supporting and propelling means for flying machines comprising a frame structure, pivoted vertically movable wings, each having a pivoted wing section hinged for vertical movements, means for permitting feathering motions of the pivoted wing sections on the downward movement of the wings, means for adjustably limiting the upward movement of the wing sections to working position on the downward movement of the wings, and controlling means whereby the pivoted wing sections may be adjusted to different angular or unbalanced positions, said means being adapted to simultaneously adjust said limiting means of both wing sections in the same or different directions.

3. Supporting and propelling means for flying machines comprising a framework, pivotally vertically movable wings, each having a pivoted vertically movable section, means for permitting feathering motion of the pivoted wing sections on the upward motion of the wings, adjustable stop devices for limiting the pivoted wing sections on their upward movements to working positions in the downward movements of the wings, means for adjusting the right and left hand stop devices in the same direction in unison, and means for adjusting the right and left hand stop devices in opposite directions in unison.

In testimony whereof I affix my signature in presence of two witnesses.

FRANK EZRA SUMMERS.

Witnesses:
J. M. JAYNE,
WILLIAM L. SCOTT.

Copies of this patent may be obtained for five cents each, by addressing the "Commissioner of Patents, Washington, D. C."